United States Patent (12) United States Patent
Mensch et al.

(10) Patent No.: US 8,346,717 B1
(45) Date of Patent: Jan. 1, 2013

(54) MANAGING FILE SYSTEMS (75) Inventors: James Mensch, San Jose, CA (US);
Joshua Shaffer, San Jose, CA (US);
Ronnie Misra, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 437 days.

(21) Appl. No.: 12/175,390

(22) Filed: Jul. 17, 2008

(51) Int. Cl.
*G06F 7/00* (2006.01)
(52) U.S. Cl. ........................................................ 707/609
(58) Field of Classification Search .................. 707/705, 707/609
See application file for complete search history.

(56) References Cited

U.S. PATENT DOCUMENTS

| | | | |
|---|---|---|---|
| 5,403,639 A | 4/1995 | Belsan et al. | |
| 6,839,760 B1 * | 1/2005 | Walters | 709/229 |
| 2003/0009747 A1 * | 1/2003 | Duran | 717/137 |
| 2005/0187965 A1 | 8/2005 | Abajian | |
| 2005/0193267 A1 * | 9/2005 | Liu et al. | 714/38 |

* cited by examiner

*Primary Examiner* — Truong Vo
(74) *Attorney, Agent, or Firm* — Womble Carlyle Sandridge & Rice LLP (57) ABSTRACT

A path request is generated by a secondary platform application, such as a word processor, and is received by invention. The path request may contain the location of a library required for the application to function, or a document saved previously by a user. The path request comprises a complete path for the requested file. The complete path is formatted for a file system and file structure for expected by the application. The elements of the path request, such as directories, disks, filenames, file types, etc. are analyzed by the invention in order to provide another complete path. The path provided by the invention is formatted for a different file system and file structure. The file pointed to by the path provided for the invention enables the secondary platform application to find and use the requested file.

38 Claims, 13 Drawing Sheets

MANAGING FILE SYSTEMS

BACKGROUND OF THE INVENTION

Modern data processing systems function using different operating systems, such as Mac OS X from Apple, Inc. in Cupertino, Calif. and Microsoft Windows Vista from Microsoft Corporation in Redmond, Wash. These operating systems utilize distinct file systems. Applications written for one file system, such as the file system of Windows Vista, would not be able to utilize the file system of OS X without additional development or support. The disparate and incompatible operating systems and their respective file systems can present a challenge to a typical user in possession of a data processing system running one operating system and desiring to run an application program that requires a different, incompatible operating system. One example of a previous attempt to address this challenge is Wine, which is a compatibility layer for running Windows programs. Further information is available at http://winehq.org/.

SUMMARY OF THE DESCRIPTION

Methods for managing file systems in a data processing system and systems for managing file systems are described herein.

A path request is generated by a secondary platform application, such as a word processor, and is received by invention. The path request may contain the location of a library required for the application to function, or a document saved previously by a user. The path request comprises a complete path to the location of the requested file. The complete path is formatted for a file system and file structure expected by the secondary platform application.

The elements of the path request, such as directories, disks, filenames, file types, etc., are analyzed by the invention in order to provide another complete path. The path provided by the invention is formatted for a different file system and file structure. The file pointed to by the path provided by the invention enables the secondary platform application to find and use the requested file.

Figure 1:
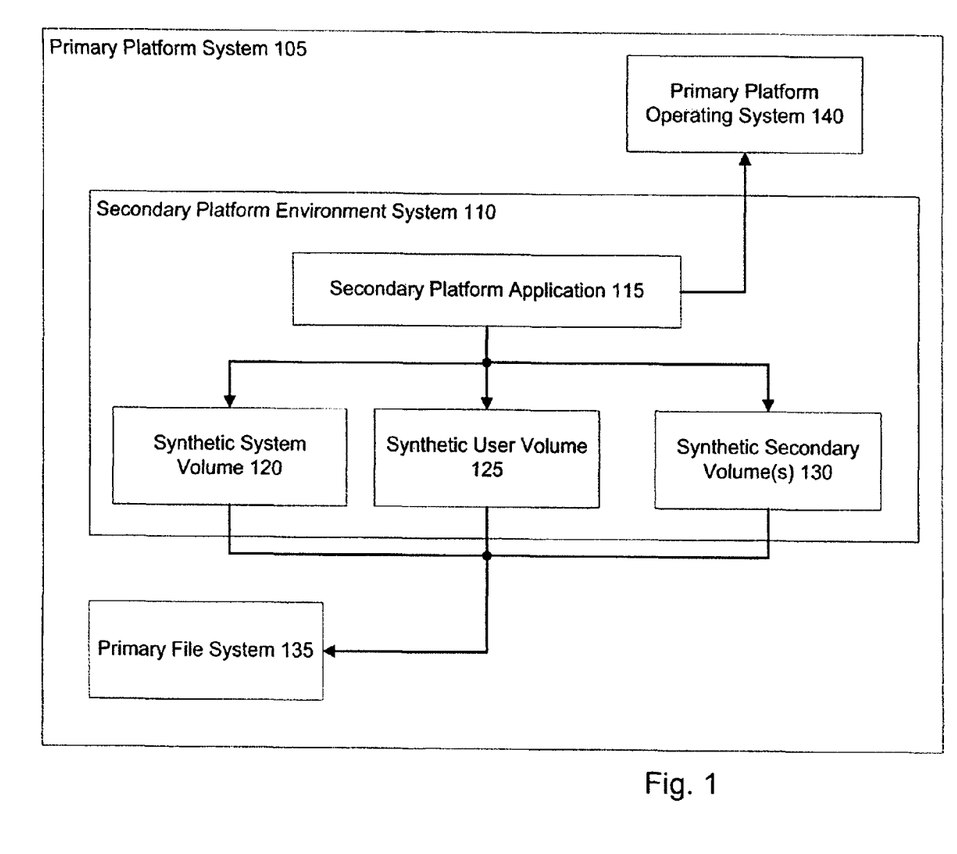
FIG. 1 is a diagram illustrating an overview of the operation of an embodiment of the invention.

In one exemplary embodiment, a primary platform system 105 as in FIG. 1 is a Mac computer running as a primary operating system 140 Mac OS X. A secondary platform application, such as a word processor, is intended to execute on secondary operating system using a different file system. By providing a secondary platform environment system 110, a synthetic file system represented by synthetic volumes 120, 125, and 130 provides the file system support to the extent such support is assumed in the operation of the secondary platform application 115. Where the secondary platform application 115 requires no file system support beyond a location in which to find or store data files, the invention grafts the syntax of the secondary platform environment file system onto the primary file system 135. The instant invention allows users to use the same user storage as they would when running applications directly on the primary platform operating system and to use them in the same way. For example, suppose a user has stored a photograph in their local "photos" directory under OS X. The user now wishes to edit the photo using a photographic editing utility written exclusively for the secondary operating system. The user may now start the utility, navigate to precisely the same local "photos" directory as if the user were running a native OS X application, and edit the photo using the secondary platform application.

Other aspects of the present invention include various data processing systems which perform these methods and machine readable media which perform various methods described herein.

BRIEF DESCRIPTION OF THE DRAWINGS

The present invention is illustrated by way of example and not limitation in the figures of the accompanying drawings in which like references indicate similar elements.

FIG. 10 is a diagram illustrating an example of a user volume resolver method according to an embodiment of the invention;

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

The present description includes material protected by copyrights, such as illustrations of graphical user interface images. The owners of the copyrights, including the assignee of the present invention, hereby reserve their rights, including copyright, in these materials. The copyright owner has no objection to the facsimile reproduction by anyone of the patent document or the patent disclosure, as it appears in the Patent and Trademark Office file or records, but otherwise reserves all copyrights whatsoever. Copyright Apple, Inc. 2007.

FIG. 1 illustrates an overview of a file system management system according to an embodiment of the invention. Primary platform system 105 comprises a primary platform operating system 140, a secondary platform environment system 110, and a primary file system 135. Secondary platform environment system 110 provides support for secondary platform application 115. For example, secondary platform application 115 may be a word processor intended to run under a secondary platform operating system and primary platform operating system 140 may be Mac OS X. Environment system 110 provides synthetic system volume (SSV) 120, synthetic user volume (SUV) 125 and synthetic secondary volumes (S2V) 130 to secondary platform application (SPA) 115.

SPA 115 executes within environment system 110 as if executing in its intended operating system, while environment system 110 molds SPA 115's file system needs into the primary file system 135 in a manner transparent to SPA 115. Since SPA 115's file system expectations are preserved by environment system 110, SPA 115 need not be modified to run in environment system 110. From the perspective of the user of SPA 115, the file system remains primary file system 135. The interaction between environment system 110 and SPA 115 is described below in greater detail in conjunction with FIG. 2. SSV 120 provides SPA 115 with access to system and application data files. The interaction between SPA 115 and SSV 120 is described below in greater detail in conjunction with FIG. 4. SUV 125 provides SPA 115 with access to the user's file space in primary file system 135, by synthesizing a file space in the manner expected by SPA 115. The interaction between SPA 115 and SUV 125 is described below in greater detail in conjunction with FIG. 6. S2V 130 provides SPA 115 with synthetic access to secondary volumes such as CD-ROM and file systems other than primary file system 135; S2V 130 may integrate any file system into environment system 110. The interaction between SPA 115 and S2V 130 is described below in greater detail in conjunction with FIG. 7. Environment system 110 also intercepts system and application programmer's interface (API) calls from SPA 115 and conforms them to the requirements of primary platform operating system 140.

Figure 2:
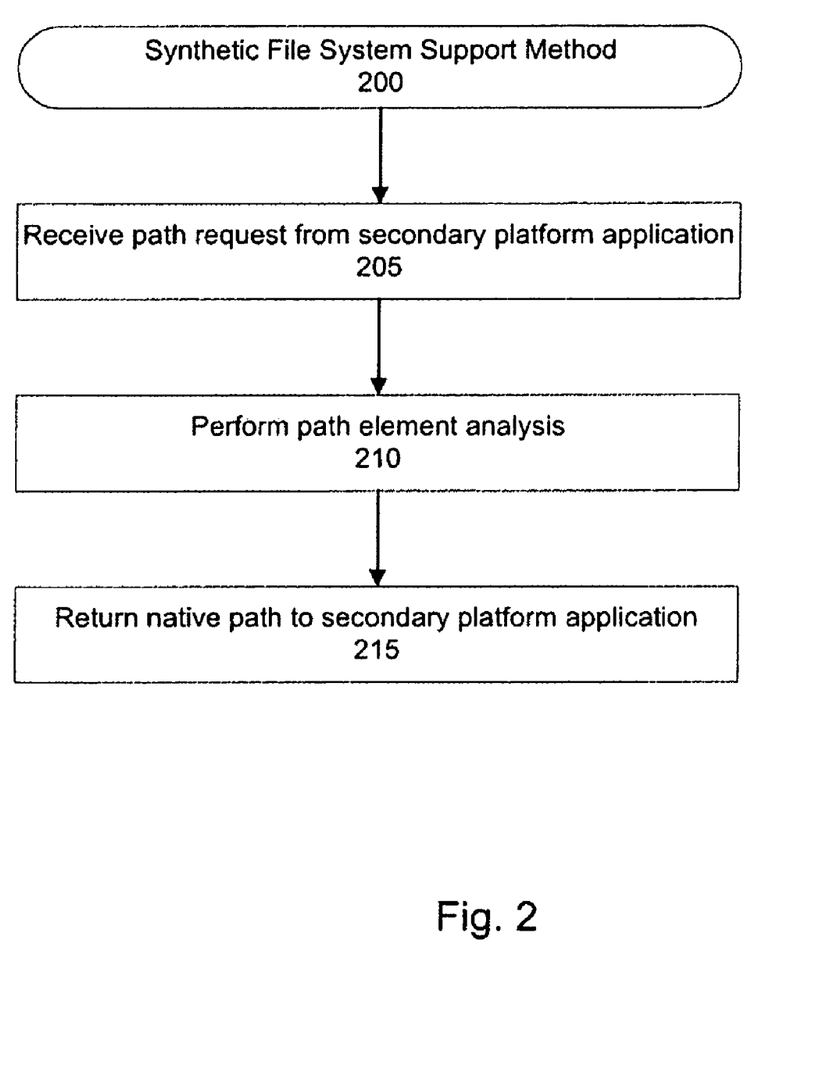
FIG. 2 is a flow diagram illustrating a file system support method to be performed by a processor according to an embodiment of the invention.

Turning to FIG. 2, synthetic file system support method 200 illustrates one embodiment of the file system support provided to SPA 115 by environment system 110. At block 205, the method 200 receives a path request from SPA 115. At block 210, the method 200 performs a path element analysis on the path request, described below in greater detail in conjunction with FIG. 3. At block 215, the method 200 returns a native path to SPA 115. The native path allows SPA 115 to access primary file system 135 without being aware of its structure.

Figure 3:
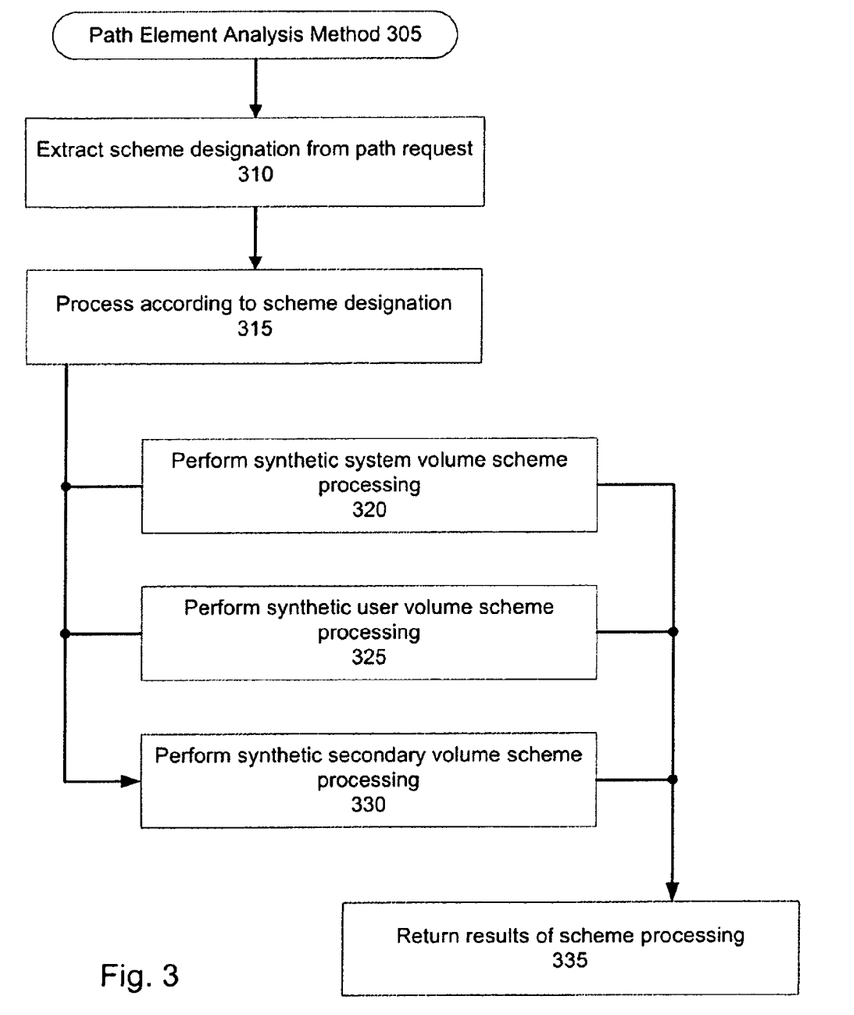
FIG. 3 is a flow diagram illustrating a path element analysis method to be performed by a processor according to an embodiment of the invention.

Turning to FIG. 3, path element analysis method 305 illustrates one embodiment of the path element analysis performed by the file system support method 200 at block 210. At block 310, the method 305 extracts a scheme designation from the path request received at block 205. In one embodiment, a scheme designation is a disk drive letter, such as "C." At block 315, the method 305 begins processing of the path request received at block 205 by selecting a processing method according to the scheme designation extracted at block 310.

If the scheme designation indicates a path request in SSV 120, the method 305 performs synthetic system volume scheme processing at block 320, described below in greater detail in conjunction with FIGS. 4, 5, 8 and 9. If the scheme designation indicates a path request in SUV 125, the method 305 performs synthetic user volume scheme processing at block 325, described in greater detail below in conjunction with FIGS. 6, 10 and 12. If the scheme designation indicates a path request in S2V 130, the method 305 performs synthetic secondary volume scheme processing at block 330, described in greater detail below in conjunction with FIGS. 7 and 11. At block 335, the method 305 returns the results of scheme processing and execution resumes at block 215 of file system support method 200.

Figure 4:
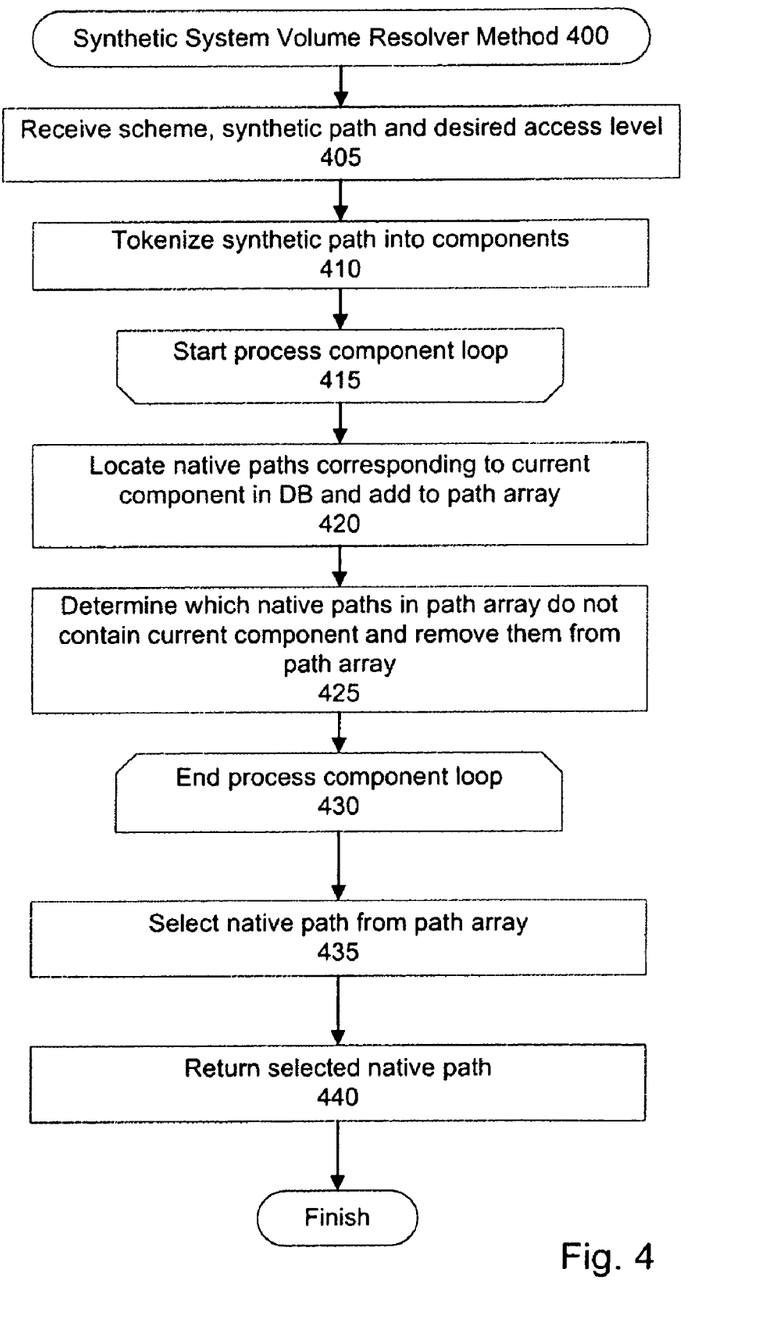
FIG. 4 is a flow diagram illustrating a system volume resolver method to be performed by a processor according to an embodiment of the invention.
Figure 8:
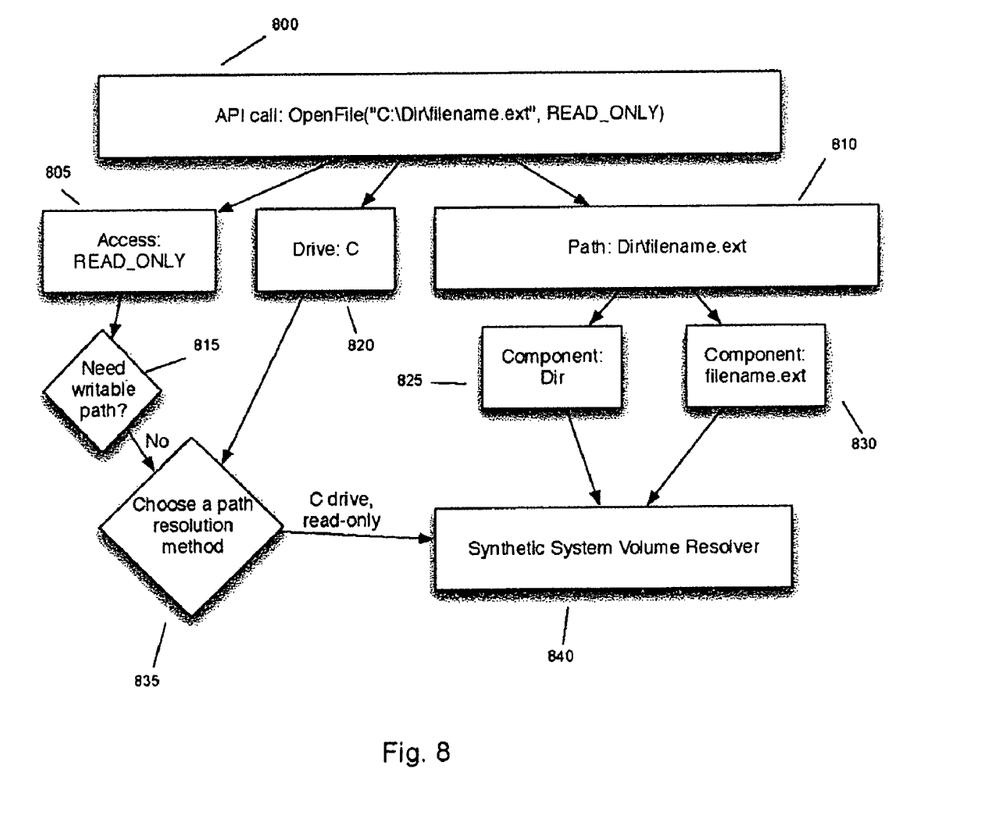
FIG. 8 is a diagram illustrating an example of a system volume resolver method according to an embodiment of the invention.

Turning to FIG. 4, synthetic system volume resolver method 400 illustrates one embodiment of the synthetic system volume scheme processing performed by method 305 at block 320. At block 405, the method 400 receives a scheme designation, a path, and a desired access level for the path request received at block 205 of the method 200. Block 800 of FIG. 8 illustrates the path request received by method 400 at block 405. At block 410, the method 400 tokenizes the synthetic path into its components, as illustrated in blocks 810, 825, and 830 of FIG. 8. The method 400 enters process component loop at block 415. For each component resulting from the tokenization of the path at block 405, the method 400 locates native paths corresponding to the current component in a database and adds the corresponding paths to a path array. At block 425, the method 400 determines which of the native paths in the path array contain the current component and removes those native paths that do not contain the current component from the path array. After processing all components of the path, the method 400 terminates the process component loop at block 430. At block 435, the method 400 selects a native path from the path array, as discussed below in greater detail in conjunction with FIG. 5. At block 440, the method 400 returns the selected native path and execution resumes at block 335 of FIG. 3.

Figure 5:
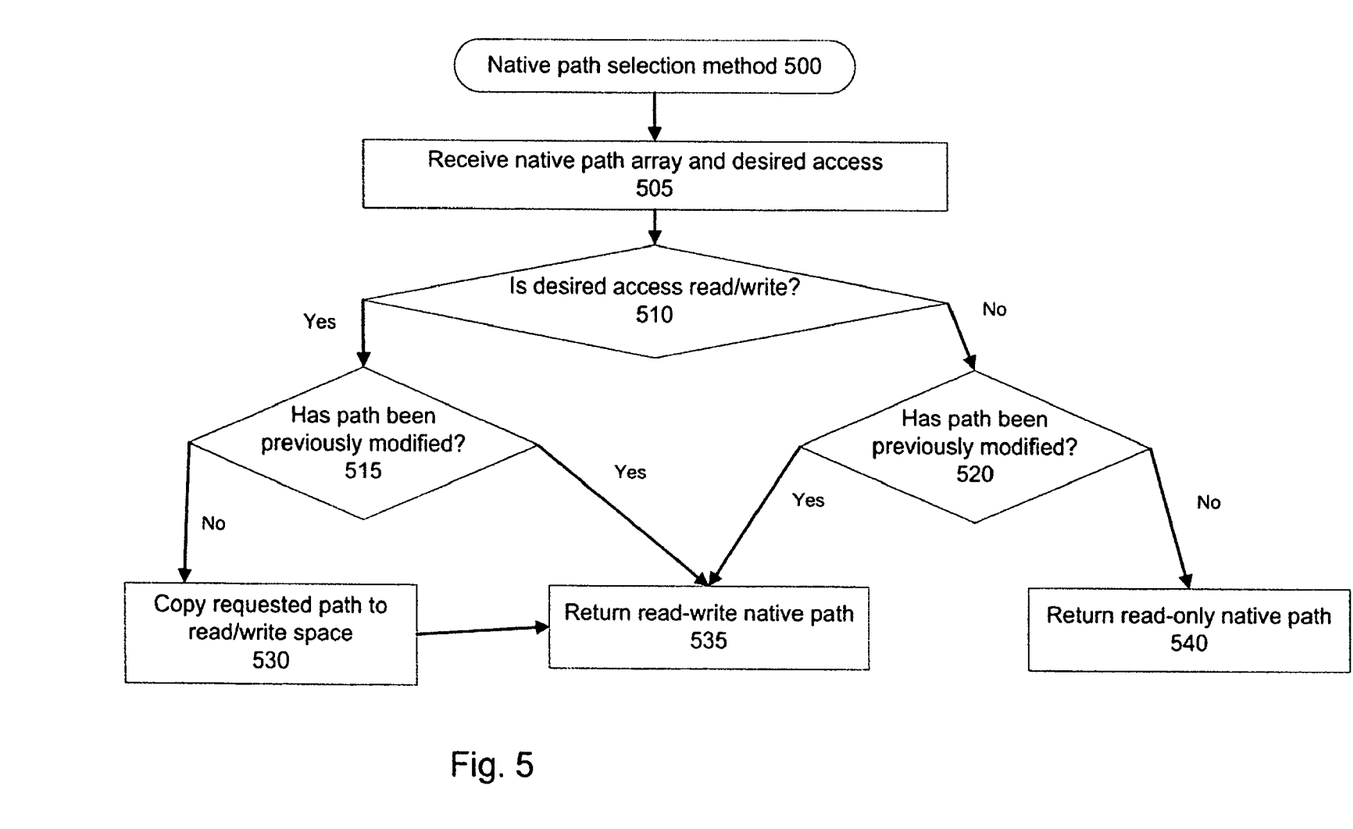
FIG. 5 is a flow diagram illustrating a native path selection method to be performed by a processor according to an embodiment of the invention.

Turning to FIG. 5, native path selection method 500 illustrates one embodiment of the native path selection performed at block 435 by the method 400. At block 505, the method 500 receives the native path array and the desired access level. In one embodiment, desired access levels are either read-only or read-write.

The method 500 determines at block 510 whether the desired access level of the path request is read-write or read-only. If the method determines at block 510 that the desired access level is read-write, the method 500 proceeds to block 515 and determines whether previous modifications have been made to the requested file. In one embodiment, a path has been previously modified if the path has been requested with read-write access prior to this request. If the method 500 determines that the path has not been previously modified, the method 500 copies the requested path from the read-only space into read-write space at block 530. At block 535, the method 500 returns a read-write native path to the copied path, and execution resumes at block 440 of method 400. If the method 500 determines that the requested path has been previously modified, it locates the native read-write path created by the previous request and returns that path at block 535. If the method 500 determines at block 510 that the desired access is read-only and determines at block 520 that the path has not been previously modified as described above, the method returns a read-only native path to the requested path at block 540 and execution resumes at block 440 of the method 400. In one embodiment, system volume file are not modified after installation. If SPA 115 modifies an SSV file, it works on a copy. The method 500 conceals this from SPA 115 and preserves the transparent synthesis of SPA 115's expected file system.

Figure 9:
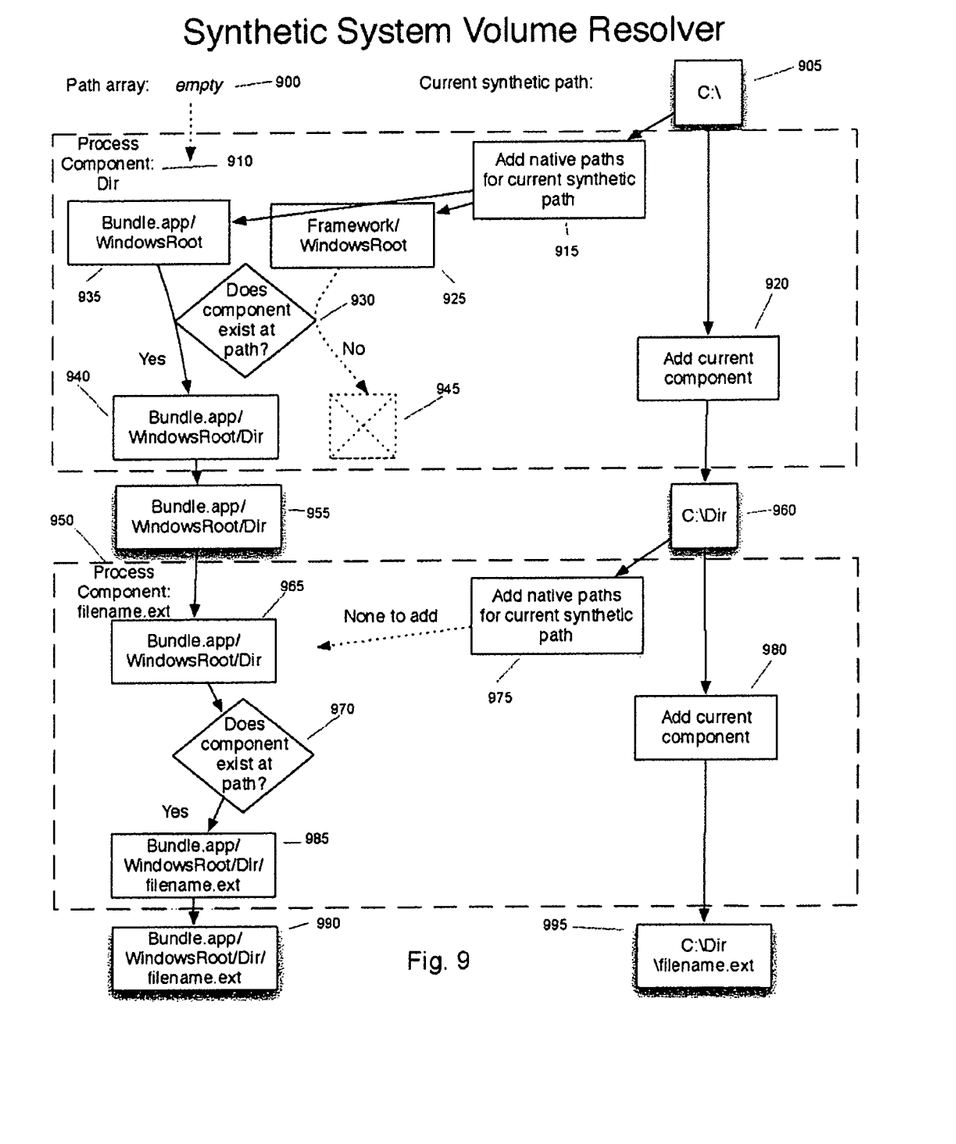
FIG. 9 is a diagram illustrating another example of a system volume resolver method according to an embodiment of the invention.

FIGS. 8 and 9 illustrate execution of the methods 200, 305, 400, and 500 according to an embodiment of the invention. Environment system 110 intercepts and processes the path request 800 made by SPA 115. File system support method 200 extracts access 805, scheme designation 820 and path request 810 from path request 800. Access 805 determines at decision 815 whether a writeable path is required to satisfy the path request 800. Writable path decision 815 and scheme designation 820 provide inputs to path resolution method selection 835, corresponding to block 315 of path element analysis method 305. In FIG. 8's example, the selection is synthetic system volume resolver 840, corresponding to block 320 of method 305. The method 400 tokenizes path 810 at block 410 and the resulting components 825 and 830 become inputs to synthetic system volume resolver 840.

FIG. 9 illustrates an embodiment of the invention wherein the primary operating system 140 is Mac OS X and secondary platform application 115 is an application program intended to execute on a secondary platform operating system, such as a word processor. Path array 900 is initially empty and fills with native paths, one of which will return to SPA 115 in response to path request 800. The initial value of current synthetic path 905 is "C." In this embodiment, "C" represents the system volume for SPA 115. Path requests such as path request 800 that include the scheme designation "C" may be assumed to have originated from SPA 115's internal file requirements. Alternatively, a path request resulting from SPA 115 displaying an open file window to a user would result in a path to the synthetic user volume. Environment system 110 generally prevents a user of SPA 115 from navigating to a path with the "C" scheme designation. Environment system 110 uses synthetic system volume paths to preserve SPA 115's expectations about the file system and file structure. In one embodiment, the synthetic file system perceived by SPA 115 has no on-disk counterpart. Instead, the perceived file system is split amongst native storage, for example, native paths 925 and 935. Because SPA 115 generates and receives paths formatted for its expected file system, the synthesis of SPA 115's file system is transparent to SPA 115. In another embodiment, synthetic system volume paths would include library and dependency paths since SPA 115 would expect certain files, such as dynamic linked libraries (.dll), to be present in such paths.

At add native paths 915, method 400 adds, at block 420, native paths corresponding to the current synthetic path 905. The method 400 locates two native paths 935 and 925 in the database and adds them to path array 900. At 930, the method 400, at block 425, determines if either native paths 935 or 925 contain the component 825. Native path 935 is determined to contain component 825 and remains in path array 900 at block 940. The method 400 determines that native path 925 does not contain the component and removes path 925 from path array 900 at block 945. The method 400 adds component 825 to current synthetic path 905 at block 920. Path array 955 and current synthetic path 960 become inputs to the next iteration of component loop 415. At block 975, the method 400 searches the database for the remaining path array element 955 to determine if the method 400 should add more native paths should to the path array. The method 400 makes no further path array entries because the search of the database returns no results. Test 970 receives path array element 965 as input in order to determine if the current component 830 is in the path. Test 970 is successful, so current component 830 is appended to remaining path array element 965 to form path array element 985. The method 400 appends current component 830 to synthetic path 960 to form current synthetic path 980. Resulting native path 990 and synthetic path 995 are returned and execution resumes at block 435 of the method 400.

Figure 6:
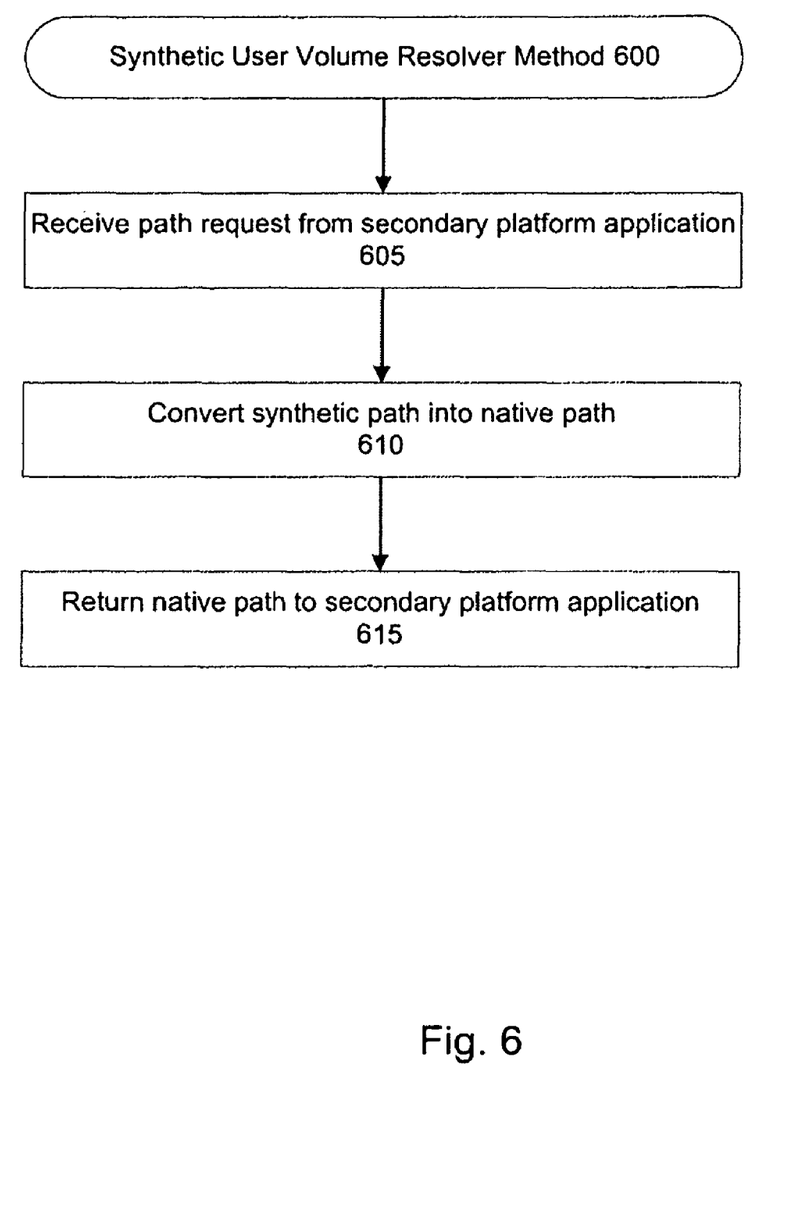
FIG. 6 is a flow diagram illustrating a user volume resolver method to be performed by a processor according to an embodiment of the invention.

Turning to FIG. 6, synthetic user volume resolver method 600 illustrates an embodiment of synthetic user volume scheme processing performed by the method 305 at block 325. At block 605, the method 600 receives a path request 1000, described in greater detail blow in conjunction with FIG. 10. At block 610, the method 600 converts the synthetic path request into a native path. At block 615, the method 600 returns the native path to SPA 115. In one embodiment, SPA 115 will request an SSV path that corresponds to an existing primary file system 135 path, such as a default directory containing music data. System volume resolver method 400 will generate a user volume path such as OS X's "~/music" path.

Figure 12:
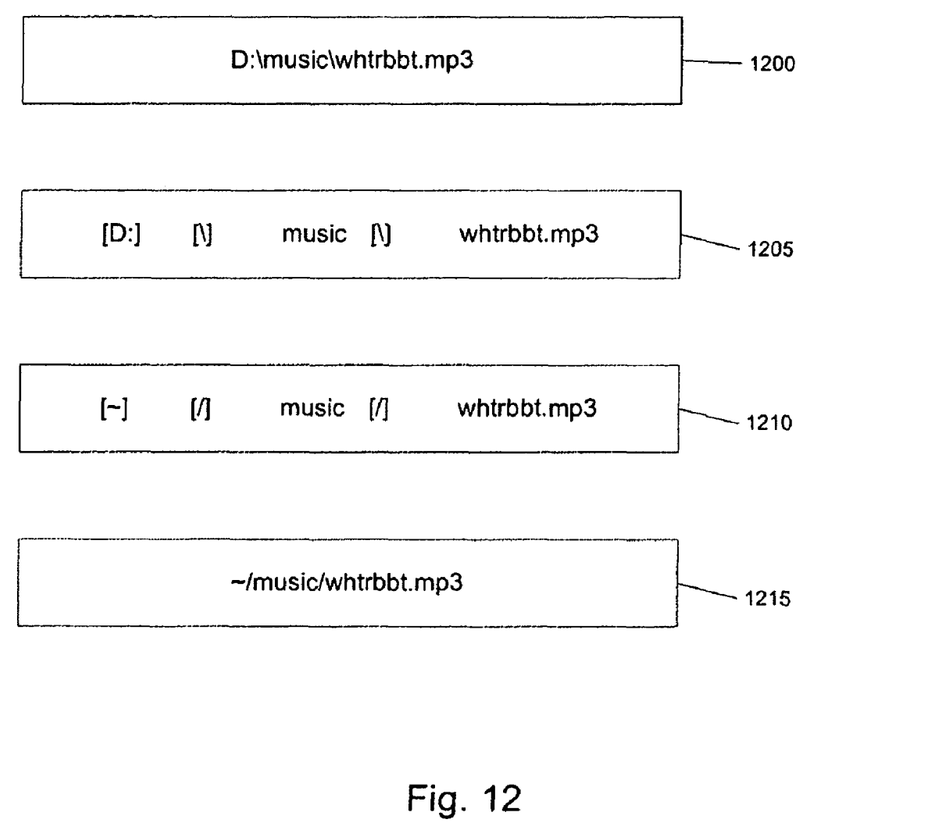
FIG. 12 is a diagram illustrating another example of a user volume resolver method according to an embodiment of the invention.

FIG. 10 further illustrates an embodiment of the invention wherein the primary operating system 140 is Mac OS X and secondary platform application 115 is an application program intended to execute on a secondary platform operating system, such as a word processor. Path request 1000 contains scheme designation 1020 which indicates, in this embodiment, that SPA 115 is requesting a path in the synthetic user volume. Method 300 determines access 1005 is read-write, causing decision 1015 to require a writable path. Decision 1035, in response to inputs 1015 and 1020, selects the synthetic user volume resolver, corresponding to the method 600 described above. Method 300 tokenizes path 1010 into components 1025 and 1030 and uses them as inputs for synthetic user volume resolver 1040. FIG. 12 illustrates the execution of one embodiment of the method 600, which uses string processing to convert a synthetic path into a native path. At block 1200, the original synthetic path request as received by the method 200 from SPA 115 is shown. Method 300 tokenizes the request at block 1205. The method 600 replaces, at block 1210, delimiters and scheme designations used by SPA 115 with counterparts used by the file system of primary operating system 140. At block 1215, method 600 returns the converted path to SPA 115.

Figure 7:
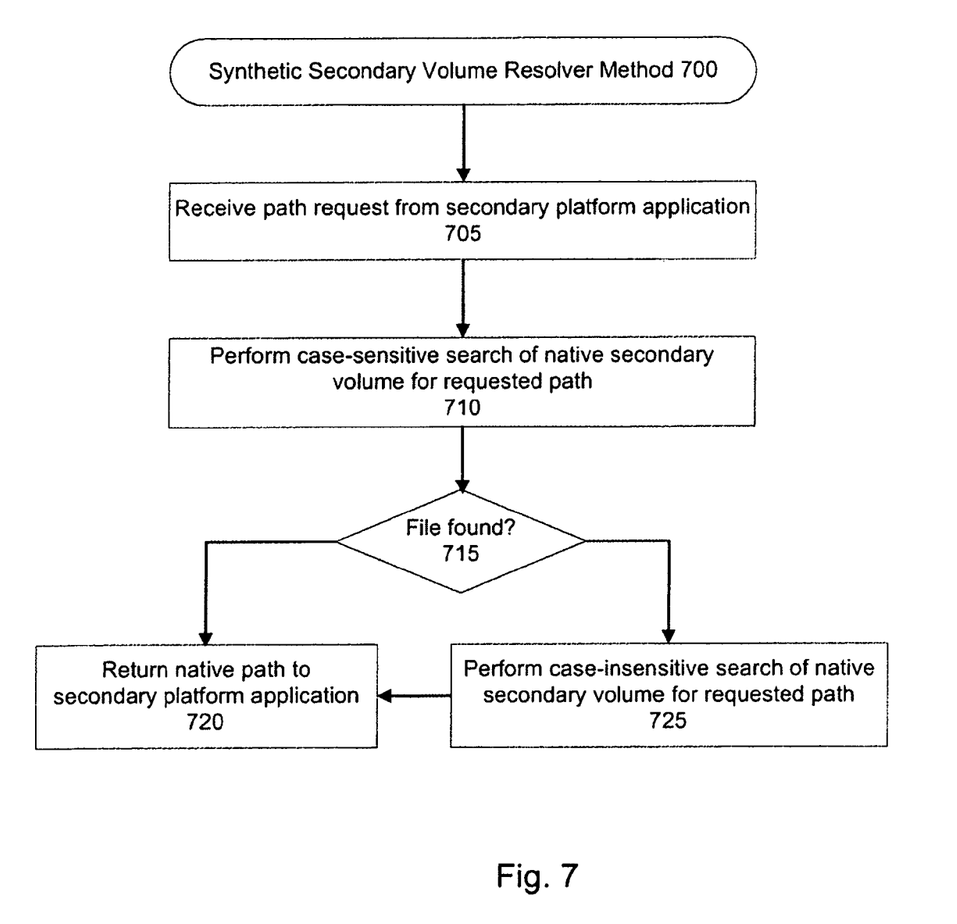
FIG. 7 is a flow diagram illustrating a secondary volume resolver method to be performed by a processor according to an embodiment of the invention.

Turning to FIG. 7, synthetic secondary volume resolver method 700 illustrates an embodiment of synthetic secondary volume scheme processing performed by method 305 at block 330. At block 705, the method 700 receives a path request 1100 from SPA 115. Path request 1100 is described below in greater detail in conjunction with FIG. 11. At block 710, the method 700 performs a case-sensitive search of the secondary volume for the requested path. At block 715, the method 700 determines whether it found the requested file using case sensitive search 710. If the method 700 found the file, the method 700 returns the native path to SPA 115 at block 720. Otherwise, the method 700 performs a case insensitive search for the requested path on the secondary volume at block 725 and returns the native path, if found, at block 720. In one embodiment, the primary operating system 140 is Mac OS X, which uses a case sensitive file system. In this embodiment, the secondary platform application 115 is intended to run under an operating system which uses a case insensitive file system. The method 700 addresses this distinction by first searching in a case-sensitive manner, in which the differing file systems would be incidentally synchronized as to the path, or, if case sensitive searching is unsuccessful, using a case insensitive search. The latter, case insensitive search may locate the desired file, because SPA 115, written for a case insensitive file system, may format its path request in such a way so as to fail a case sensitive search despite being otherwise correct as to the location of the desired file. The method 700 overcomes this difficulty. However, those skilled in the art will appreciate that case sensitivity is only one of several distinctions between file systems that could be overcome using a method similar to method 700. In this way, any number of differing file systems may be transparently integrated into environment system 110.

Figure 11:
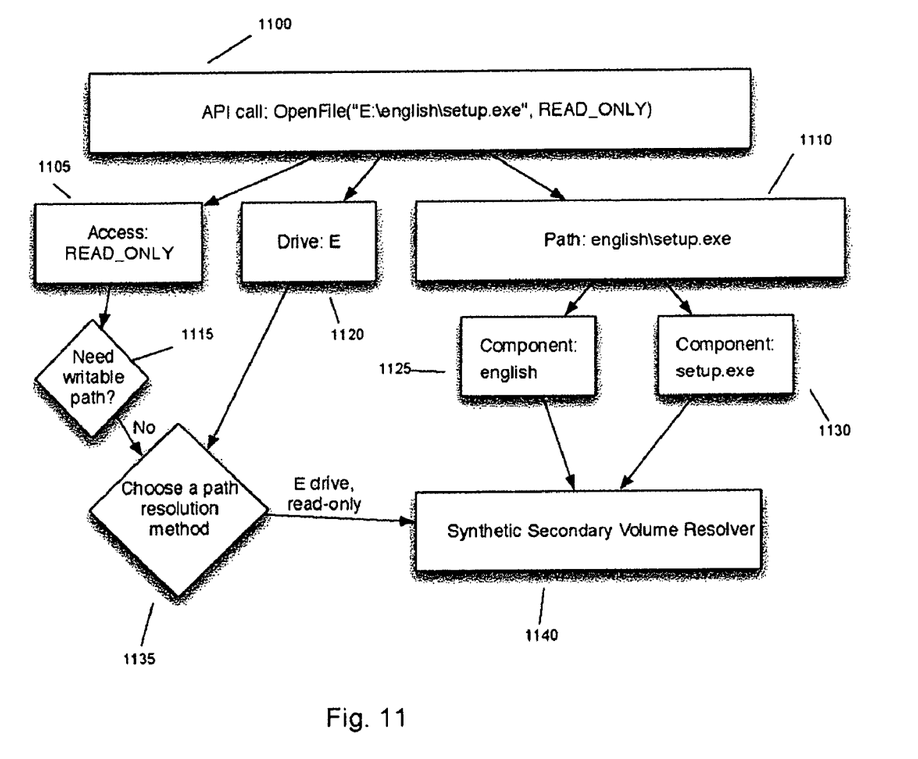
FIG. 11 is a diagram illustrating an example of a secondary volume resolver method according to an embodiment of the invention.

FIG. 11 further illustrates an embodiment of the invention wherein the primary operating system 140 is Mac OS X and secondary platform application 115 is an application program intended to execute on a secondary platform operating system, such as a spreadsheet program. Path request 1100 contains scheme designation 1120 which indicates a secondary volume, such as an ISO CD-ROM or other file system. Access 1105 indicates to decision 1115 that a writable path is not needed. Inputs 1115 and 1120 cause chooser 1135 to select synthetic secondary volume resolver 1140, corresponding to synthetic secondary volume scheme 330 and method 700. Path 1110 is tokenized into components 1125 and 1130 and input to secondary volume resolver 1140.

Figure 13:
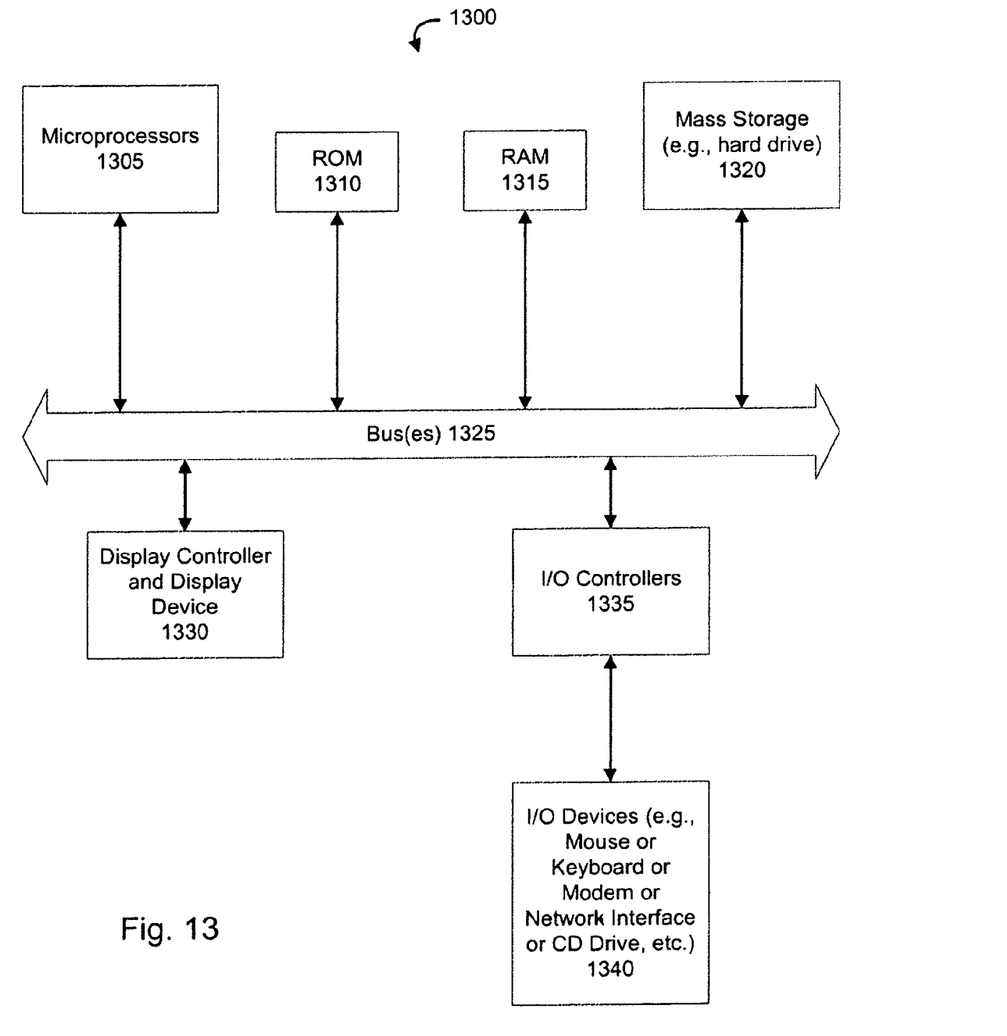
FIG. 13 is a diagram illustrating an exemplary embodiment of a data processing system, which may be a general purpose computer system and which may operate in any of the various methods described herein.

FIG. 13 illustrates an exemplary computer system 1300, also known as a data processing system that can for example form the file system management system of FIG. 1. The operations, processes, modules, methods, and systems described and shown in the accompanying figures of this disclosure are intended to operate on one or more exemplary computer systems 1300 as sets of instructions (e.g., software), also known as machine implemented methods. The exemplary computer system 1300 is generally representative of personal or client computers, mobile devices, (e.g., mobile cellular device, PDA, satellite phone, mobile VoIP device), and servers. A mobile device will also have an antenna and a microchip, for running a protocol for the radio frequency reception and transmission of communications signals. The exemplary computer system 1300 includes at least processor 1305 (e.g., a Central Processing Unit (CPU), a Graphics Processing Unit (GPU) or both), a Read Only Memory (ROM) 1310, a Random Access Memory (RAM) 1315, and a Mass Storage 1320 (e.g., a hard drive) which communicate with each other via a bus or buses 1325.

The computer system 1300 may further include a Display Controller and Display Device 1330 (e.g., Liquid Crystal Display (LCD) or a Cathode Ray Tube (CRT) or a touch screen). The computer system 1300 also includes an I/O Controller 1335 and an I/O Devices 1340 (e.g., mouse, keyboard, modem, network interface, CD drive, etc.) The network interface device will at least be wireless in case of a mobile device, for communicating to a wireless network (e.g. cellular, VoIP). A mobile device will include one or more signal input devices (e.g. a microphone, camera, fingerprint scanner) which is not shown.

The disk drive unit 1320 includes a machine-readable medium on which is stored one or more sets of instructions (e.g. software) embodying any one or more methodologies or functions. The software may also reside, completely or at least partially, within the RAM 1315 or ROM 1310 and/or within the processor 1305 during execution thereof by the computer system 1300, the RAM 1315, ROM 1310 and within the processor 1305 also constituting machine-readable media. The software may further be transmitted or received over a network (not shown) via the network interface device 1340.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A machine implemented method, comprising:
receiving a first path request from a secondary platform application that was built to operate on a first operating system, the first path request comprising a first complete path for a requested file in a first file system having a first path structure that is characteristic of the first operating system, wherein the first file system comprises a plurality of synthetic volumes including a synthetic system volume and a synthetic user volume, the synthetic system volume storing files for the first operating system and the secondary platform application, and the synthetic user volume storing files for a user of the secondary platform application;
performing a path element analysis on the first path request, wherein the path element analysis provides a second complete path for the secondary platform application, the second complete path pointing to the requested file in a second file system having a second path structure that is characteristic of a second operating system, the first and second operating systems being different operating systems, and wherein performing the path element analysis includes extracting a scheme designator from the first complete path that indicates a synthetic volume scheme for the first complete path, wherein the first complete path is a synthetic path; and
preventing access to the requested file by the user if the scheme designator indicates a synthetic system volume scheme.

2. The method of claim 1, further comprising:
performing a synthetic system volume scheme process on the first path request if the scheme designator indicates the synthetic system volume scheme.

3. The method of claim 2, further comprising:
performing a synthetic user volume scheme process on the first path request if the scheme designator indicates a synthetic user volume scheme.

4. The method of claim 3, further comprising:
performing a synthetic secondary volume scheme process on the synthetic path request if the scheme designator indicates a synthetic secondary volume scheme.

5. The method of claim 4, further comprising:
performing a first search of a native secondary volume for the first complete path; and
performing a second search of the native secondary volume for the first complete path if the first search did not locate the first complete path.

6. The method of claim 5, wherein the first search is a case-sensitive search and wherein the second search is a case-insensitive search.

7. The method of claim 3, further comprising:
converting the first complete path into the second complete path, wherein the converting comprises string processing.

8. The method of claim 2, wherein performing the synthetic system volume scheme process comprises:
locating a current native path corresponding to a current synthetic path;
locating a current native path component corresponding to a current synthetic path component in the current native path; and
combining the current native path with the current native path component.

9. The method of claim 8, further comprising:
    determining if the first path request requires a read-only access or a read-write access;
    creating a read-only access native path if the first path request requires the read-only access and the first complete path has not previously been requested with the read-write access;
    creating a read-write access native path if the first path request has previously been requested with the read-write access; and
    copying a contents of the read-only access native path to the read-write access native path if the first path request requires the read-write access and the first complete path has not previously been requested with the read-write access.

10. The method of claim 1 further comprising:
    caching a result of the performing the path element analysis.

11. The method of claim 1, wherein the secondary platform application is configured to be executed on a first operating system using the first file system and wherein the secondary platform application is executed in the method for operation on a second operating system using the second file system without the presence of the first operating system.

12. The method of claim 11, wherein the first operating system is Microsoft Windows.

13. The method of claim 11, wherein the first file system is NTFS.

14. A non-transitory machine-readable storage medium storing instructions which when executed by a data processing system cause the data processing system to perform a method of processing data, the method comprising:
    receiving a first path request from a secondary platform application that was built to operate on a first operating system, the first path request comprising a first complete path for a requested file in a first file system having a first path structure that is characteristic of the first operating system, wherein the first file system comprises a plurality of synthetic volumes including a synthetic system volume and a synthetic user volume, the synthetic system volume storing files for the first operating system and the secondary platform application, and the synthetic user volume storing files for a user of the secondary platform application;
    performing a path element analysis on the first path request, wherein the path element analysis provides a second complete path for the secondary platform application, the second complete path pointing to the requested file in a second file system having a second path structure that is characteristic of a second operating system, the first and second operating systems being different operating systems, and wherein performing the path element analysis includes extracting a scheme designator from the first complete path that indicates a synthetic volume scheme for the first complete path, wherein the first complete path is a synthetic path; and
    preventing access to the requested file by the user if the scheme designator indicates a synthetic system volume scheme.

15. The non-transitory storage medium of claim 14, the method further comprising:
    performing a synthetic system volume scheme process on the first path request if the scheme designator indicates the synthetic system volume scheme.

16. The non-transitory storage medium of claim 15, the method further comprising:
    performing a synthetic user volume scheme process on the synthetic path request if the scheme designator indicates a synthetic user volume scheme.

17. The non-transitory storage medium of claim 16, the method further comprising:
    performing a synthetic secondary volume scheme process on the synthetic path request if the scheme designator indicates a synthetic secondary volume scheme.

18. The non-transitory storage medium of claim 17, the method further comprising:
    performing a first search of a native secondary volume for the first complete path; and
    performing a second search of the native secondary volume for the first complete path if the first search did not locate the first complete path.

19. The non-transitory storage medium of claim 18, wherein the first search is a case-sensitive search and wherein the second search is a case-insensitive search.

20. The non-transitory storage medium of claim 16, the method further comprising:
    converting the first complete path into the second complete path, wherein the converting comprises string processing.

21. The non-transitory storage medium of claim 15, wherein performing the synthetic system volume scheme process comprises:
    locating a current native path corresponding to a current synthetic path;
    locating a current native path component corresponding to a current synthetic path component in the current native path; and
    combining the current native path with the current native path component.

22. The non-transitory storage medium of claim 21, the method further comprising:
    determining if the first path request requires a read-only access or a read-write access,
    creating a read-only access native path if the first path request requires the read-only access and the first complete path has not previously been requested with the read-write access;
    creating a read-write access native path if the first path request has previously been requested with the read-write access; and
    copying a contents of the read-only access native path to the read-write access native path if the first path request requires the read-write access and the first complete path has not previously been requested with the read-write access.

23. The non-transitory storage medium of claim 14, the method further comprising:
    caching a result of the performing the path element analysis.

24. The non transitory storage medium of claim 14 wherein the secondary platform application is configured to be executed on a first operating system using the first file system and wherein the secondary platform application is executed in the method for operation on a second operating system using the second file system without the presence of the first operating system.

25. The non-transitory storage medium of claim 24, wherein the first operating system is Microsoft Windows.

26. The non-transitory storage medium of claim 24, wherein the first file system is NTFS.

27. An apparatus comprising:
    means for receiving a first path request from a secondary platform application that was built to operate on a first operating system, the first path request comprising a first complete path for a requested file in a first file system having a first path structure that is characteristic of the first operating system, wherein the first file system comprises a plurality of synthetic volumes including a synthetic system volume and a synthetic user volume, the synthetic system volume storing files for the first operating system and the secondary platform application, and the synthetic user volume storing files for a user of the secondary platform application:

means for performing a path element analysis on the first path request, wherein the path element analysis provides a second complete path for the secondary platform application, the second complete path pointing to the requested file in a second file system having a second path structure that is characteristic of a second operating system, the first and second operating systems being different operating systems, and wherein performing the path element analysis includes extracting a scheme designator from the first complete path that indicates a synthetic volume scheme for the first complete path, wherein the first complete path is a synthetic path; and means for preventing access to the requested file by the user if the scheme designator indicates a synthetic system volume scheme.

28. The apparatus of claim 27, further comprising:
means for performing a synthetic system volume scheme process on the first path request if the scheme designator indicates the synthetic system volume scheme.

29. The apparatus of claim 28, further comprising:
means for performing a synthetic user volume scheme process on the first path request if the scheme designator indicates a synthetic user volume scheme.

30. The apparatus of claim 29, further comprising:
means for performing a synthetic secondary volume scheme process on the synthetic path request if the scheme designator indicates a synthetic secondary volume scheme.

31. The apparatus of claim 28, wherein performing the synthetic system volume scheme process comprises:
means for locating a current native path corresponding to a current synthetic path;
means for locating a current native path component corresponding to a current synthetic path component in the current native path; and
means for combining the current native path with the current native path component.

32. The apparatus of claim 31, further comprising:
means for determining if the first path request requires a read-only access or a read-write access;
means for creating a read-only access native path if the first path request requires the read-only access and the first complete path has not previously been requested with the read-write access;
means for creating a read-write access native path if the first path request has previously been requested with the read-write access; and
means for copying a contents of the read-only access native path to the read-write access native path if the first path request requires the read-write access and the first complete path has not previously been requested with the read-write access.

33. A system comprising:
a processor coupled to a bus;
a memory coupled to the processor through the bus;
a process executed by the processor from the memory to cause the processor
to receive a first path request from a secondary platform application that was built to operate on a first operating system, the first path request comprising a first complete path for a requested file in a first file system having a first path structure that is characteristic of the first operating system, wherein the first file system comprises a plurality of synthetic volumes including a synthetic system volume and a synthetic user volume, the synthetic system volume storing files for the first operating system and the secondary platform application, and the synthetic user volume storing files for a user of the secondary platform application,
to perform a path element analysis on the first path request, wherein the path element analysis provides a second complete path for the secondary platform application, the second complete path pointing to the requested file in a second file system having a second path structure that is characteristic of a second operating system, the first and second operating systems being different operating systems, and wherein the path element analysis includes extracting a scheme designator from the first complete path that indicates a synthetic volume scheme for the first complete path, wherein the first complete path is a synthetic path, and
to prevent access to the requested file by the user if the scheme designator indicates a synthetic system volume scheme.

34. The system of claim 33, the process further comprising:
performing a synthetic system volume scheme process on the first path request if the scheme designator indicates the synthetic system volume scheme.

35. The system of claim 34, the process further comprising:
performing a synthetic user volume scheme process on the first path request if the scheme designator indicates a first user volume scheme.

36. The system of claim 35, the process further comprising:
performing a synthetic secondary volume scheme process on the synthetic path request if the scheme designator indicates a synthetic secondary volume scheme.

37. The system of claim 34, wherein the synthetic system volume scheme process comprises:
locating a current native path corresponding to a current synthetic path;
locating a current native path component corresponding to a current synthetic path component in the current native path; and
combining the current native path with the current native path component.

38. The system of claim 37, the process further comprising:
determining if the first path request requires a read-only access or a read-write access;
creating a read-only access native path if the first path request requires the read-only access and the first complete path has not previously been requested with the read-write access,
creating a read-write access native path if the first path request has previously been requested with the read-write access; and
copying a contents of the read-only access native path to the read-write access native path if the first path request requires the read-write access and the first complete path has not previously been requested the read-write access.

* * * * *